March 26, 1957   M. O. BLACKBURN ET AL   2,786,538
AIRCRAFT PROPELLER BLADE
Filed May 1, 1952
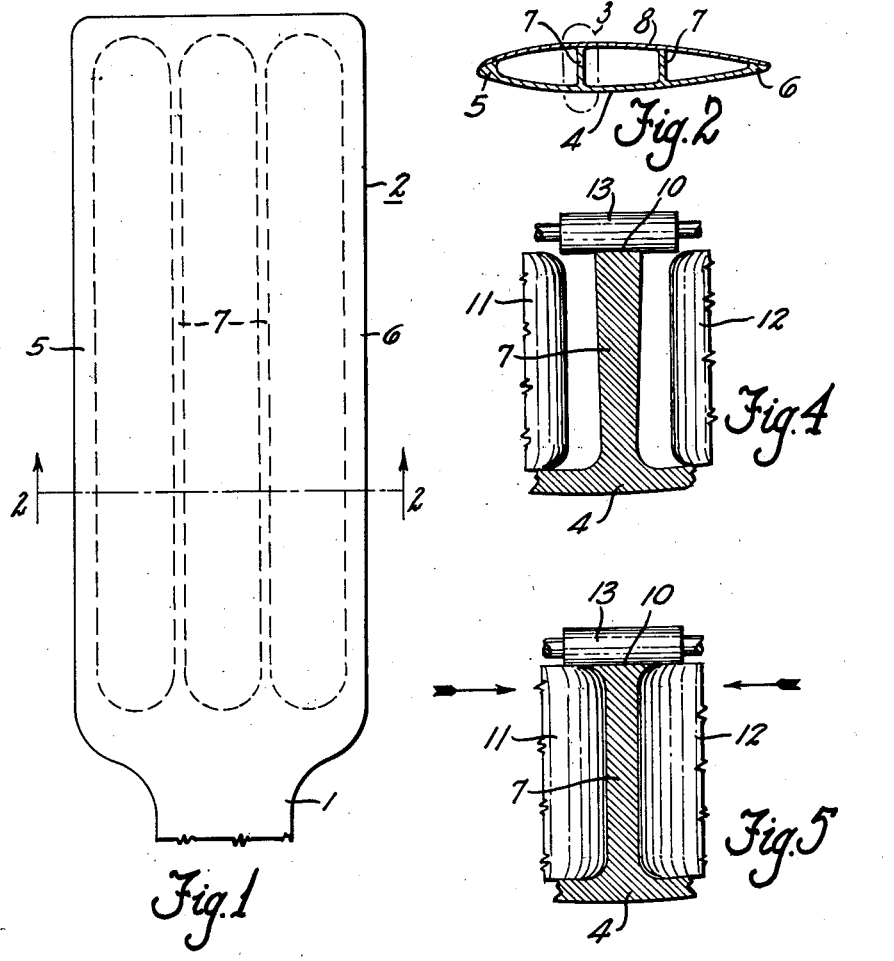
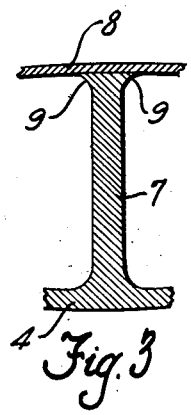
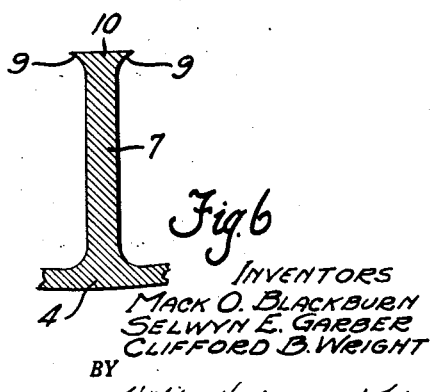
INVENTORS
MACK O. BLACKBURN
SELWYN E. GARBER
CLIFFORD B. WRIGHT
BY
THEIR ATTORNEYS

2,786,538

AIRCRAFT PROPELLER BLADE

Mack O. Blackburn and Selwyn E. Garber, Dayton, and Clifford B. Wright, Tipp City, Ohio, assignors to General Motors Corporation, Detroit, Mich., a corporation of Delaware Application May 1, 1952, Serial No. 285,416

6 Claims. (Cl. 170—159)

The present invention relates to propeller blades and more particularly to hollow aircraft propeller blades.

In hollow propeller blades of the type comprising a thrust member for sustaining the loads and a camber member to complete the blade airfoil, the overall fatigue strength of the blade is quite low due to the brazed joints between the two blade forming members. This undesirable feature resulted by reason of the sudden changes in outline at the rib joints between the two members. Accordingly, one of our objects is to provide a blade construction of the type aforementioned with means for materially increasing the blade fatigue strength, and to further provide a method of attaining the desired result.

The aforementioned and other objects are accomplished in the present invention by contouring the ribs to substantially reduce the stress concentration at the juncture between the rib or ribs and the camber member. Specifically, the longitudinally extending ribs formed on the forged thrust member are mushroomed, or provided with oppositely extending integral fillets, the edges of which terminate with a knife edge. When the camber sheet is copper brazed to the thrust member, the continuity of metal surfaces between the ribs and the camber sheet materially reduces the stress concentration along the brazed union therebetween. In this manner, the endurance or fatigue limit of the propeller blade is substantially increased.

A preferred method of contouring the rib ends adjacent the camber sheet to provide oppositely extending integral fillets is by roll upsetting. In this method, suitably shaped rollers engage opposite side surfaces of the rib and a roller engages the edge surface of the rib. Under the application of heat and pressure, the side rollers are forced toward each other causing a flow of metal which the edge roller distributes, as the rollers are moved along the rib. This results in the formation of a mushroom head, after which the side surfaces of the rib may be machined.

Further objects and advantages of the present invention will be apparent from the following description, reference being had to the accompanying drawing wherein a preferred embodiment of the present invention is clearly shown, and wherein similar reference characters denote similar parts throughout the several views.

In the drawing:

Fig. 1 is a plan view of the improved propeller blade.

Fig. 2 is a sectional view taken along line 2—2 of Fig. 1.

Fig. 3 is an enlarged fragmentary view taken within the dotted line 3 of Fig. 2.

Figs. 4, 5 and 6 are sectional views showing the sequence of steps followed in making the contoured rib.

Referring to Figs. 1 and 2, a propeller blade is shown having a cylindrical shank portion 1 and an airfoil portion, designated generally as 2. The airfoil portion 2 comprises a forged thrust member 4 having a reenforced leading edge 5 and a reenforced trailing edge 6. Between the leading and trailing edges, one or more ribs 7 may be provided depending upon the rigidity desired. The blade airfoil is completed by a rolled camber sheet 8, which is bonded to the exposed surfaces of the forged thrust member 4, preferably by copper brazing. The forged thrust member preferably comprises steel or an alloy thereof, and the camber sheet, likewise, comprises steel or alloy thereof. The blade construction is generally of the type disclosed in Patent No. 2,205,132, in the name of Blanchard, in which the forged thrust member 4 is integral with the cylindrical shank 1.

Considerable difficulty has been experienced with blades constructed according to the aforementioned Blanchard patent, in that the fatigue strength of such blades is quite low due to failures in the bonds between the camber sheet and the ribs. The apparent cause of low fatigue strength in blades of this type is due to the sudden change in outline between the ribs and the camber sheet. It is a well known phenomenon that any sudden change in outline, such as a square shoulder or a ledge in metallic articles subjected to repeated reverse stresses, substantially reduces the fatigue or endurance limit thereof. Square shoulders, or non-homogeneity of surfaces may be termed stress raisers, cause a localization or a concentration of stress applied thereto and results in a low fatigue strength. However, by providing a radius for the shoulders, thereby avoiding a sharp change in outline, the stress concentration is reduced with a consequent increase in the fatigue limit of the metallic article. In the propeller blades under discussion, fatigue experiments have demonstrated that the fatigue strength may be substantially increased by utilizing the rib construction of the present invention.

As is shown in Fig. 3, the rib 7 is provided with oppositely extending flanges, or integral fillets 9, adjacent the union between the rib and the camber sheet 8. The edges of the fillets 9 are substantially knife-like in nature to provide a substantially flush merging union between the camber sheet and the fillets 9. This is of utmost importance as it has been experimentally proven that if a ledge or shoulder of .010 inch in height exists between the fillet 9 and the camber sheet 8, the fatigue strength is substantially reduced. However, if a ledge is substantially nonexistent, the fatigue strength of the blade is substantially increased. This serves to demonstrate the effect of localized or concentrated stress caused by a sharp change in outline of even a minute thickness. However, if this ledge or shoulder is removed, the copper brazed joint between the camber sheet 8 and the rib 7 will withstand materially increased fatigue stresses, due to a substantially uniform distribution thereof along the brazed joint.

Referring to Figs. 4, 5 and 6, the preferred method of contouring the rib to provide the oppositely extending fillets 9 will be described. The longitudinally extending ribs 7, which are formed integral with the thrust member 4, originally having a configuration with somewhat diverging surfaces from the interconnection with the thrust member 4 toward the free end 10 thereof. Suitably shaped rollers 11 and 12 are disposed on opposite sides of the rib adjacent the free end 10. A roller 13 is disposed in contact with the edge of the free end 10. The roller is of such width that it overhangs the side surfaces of the rib 7 for a purpose to be described. The rollers 11 and 12 are moved toward each other under the application of heat and pressure by any suitable means, not shown. Under the application of heat and pressure, metal adjacent the free end 10 of the rib is caused to flow and the roller 13 distributes this flowing metal and forms the oppositely extending flanges or fillets 9. The rollers 11 and 12 and the roller 13 are moved along the length of the rib as a unit to contour the rib along its entire length. By reason of the roller 13 overlapping the side surfaces of the rib 7, and the rollers 11 and 12 having surfaces disposed contiguous to the overlapping roller portions to form a cavity into which the displaced metal will flow, the tendency of a ledge to form therebetween is minimized. However, if such a ledge is produced, it is preferably ground off prior to the camber sheet 8 being affixed thereto.

After the oppositely extending flanges 9 have been formed on the free end 10 on the rib, the side surfaces of the rib 7 may be machined, by grinding or the like, to provide parallel side surfaces. This is desirable to avoid any sharp changes in outline that may be produced by the rollers 11 and 12 during the contouring operation. The contoured rib is machined to have the configuration shown in Fig. 3.

The finished blade is of hollow construction having cavities into which deicing elements may be installed if desired. By providing contoured ribs, a substantial increase in the fatigue strength of this type of blade is realized. However, it must be borne in mind that the critical feature of the present invention is that the merging surfaces of the contoured ribs and the camber sheet must be substantially flush or the desired result will not be achieved.

While the embodiment of the present invention as herein disclosed, constitutes a preferred form, it is to be understood that other forms might be adopted.

What is claimed is as follows:

1. In a hollow propeller blade of the type comprising, a metal trust member having a longitudinally extending, inwardly projecting rib and an overlying camber sheet united therewith to complete the blade airfoil, means providing said rib with an integral contoured camber sheet engaging surface of substantial area that terminates in edges having a thickness less than one-hundredth of an inch whereby the fatigue strength of said blade is materially increased.

2. In a hollow propeller blade, a thrust member having an integral longitudinally extending rib, a leading edge and a trailing edge, a camber member joined to said rib, the leading edge and the trailing edge to complete the blade airfoil, said rib being provided with oppositely extending integral flanges having knife-like edges, said flanges merging with the inner surface of said camber member adjacent the joint therebetween whereby the concentration of stress along said joint is substantially uniform.

3. In a hollow propeller blade, a thrust member having a plurality of longitudinally extending ribs, a leading edge and a trailing edge, a camber member joined to said ribs, the leading edge and the trailing edge to complete the blade airfoil, said ribs being provided with oppositely extending integral flanges having knife-like edges, said flanges merging with the inner surface of said camber member adjacent the joint therebetween whereby the stress concentration at the merging edges of said ribs and the inner surface of the camber member is substantially lessened.

4. In a hollow propeller blade, a metal thrust member having a longitudinally extending rib, a leading edge and a trailing edge, an overlying camber sheet joined to said rib, leading edge and trailing edge to complete the blade airfoil, said rib being provided with oppositely extending integral flanges having edges less than one-hundredth of an inch in thickness, said flanges merging with the inner surface of said camber sheet adjacent the joint therebetween whereby the concentration of stress along said joint is substantially uniform.

5. In a hollow propeller blade comprising, a thrust member having a longitudinally extending, inwardly projecting rib and an overlying camber member united therewith to complete the blade airfoil, means providing said rib with an integral contoured camber member engaging surface of substantial area that terminates in knife-like edges which merge with the inner surface of the camber member adjacent the union therebetween whereby the fatigue strength of said blade is materially increased.

6. In a hollow propeller blade comprising, a thrust member having a plurality of marginal and intermediate upstanding ribs and an overlying camber member united with said ribs to complete the blade airfoil, means providing at least one of said ribs with an integral contoured camber member engaging surface of substantial area that terminates in knife-like edges which merge with the inner surface of said camber member adjacent the union therebetween whereby the fatigue strength of said blade is materially increased.

References Cited in the file of this patent

UNITED STATES PATENTS

| | | |
|---|---|---|
| 179,694 | Fraser | July 11, 1876 |
| 410,724 | York | Sept. 10, 1889 |
| 420,498 | Kriete | Feb. 4, 1890 |
| 807,432 | Blakey | Dec. 19, 1905 |
| 1,013,567 | Sack | Jan. 2, 1912 |
| 1,021,137 | Duncan | Mar. 26, 1912 |
| 1,076,784 | Puppe | Oct. 28, 1913 |
| 1,814,593 | Gersman | July 14, 1931 |
| 1,937,966 | Junkers | Dec. 5, 1933 |
| 2,015,332 | Baumann | Sept. 24, 1935 |
| 2,143,554 | Harper | Jan. 10, 1939 |
| 2,205,132 | Blanchard | June 18, 1940 |
| 2,212,170 | Richardson | Aug. 20, 1940 |
| 2,214,339 | McKee | Sept. 10, 1940 |
| 2,231,750 | Damerell | Feb. 11, 1941 |
| 2,326,430 | Blanchard | Aug. 10, 1943 |
| 2,361,729 | Nedden | Oct. 31, 1944 |
| 2,424,875 | Brady | July 29, 1947 |
| 2,431,411 | McKee | Nov. 25, 1947 |
| 2,440,115 | Palmatier | Apr. 20, 1948 |
| 2,457,202 | Brady | Dec. 28, 1948 |
| 2,485,534 | Mayne | Oct. 18, 1949 |
| 2,512,264 | Baauchler | June 20, 1950 |

FOREIGN PATENTS

| | | |
|---|---|---|
| 958,272 | France | Sept. 12, 1949 |